United States Patent [19]

Brodbeck

[11] Patent Number: 4,595,798

[45] Date of Patent: Jun. 17, 1986

[54] TELEPHONE NUMBER INPUT TERMINAL DEVICES

[75] Inventor: Robert M. Brodbeck, Littleton, Colo.

[73] Assignee: Marcamor, Inc., Denver, Colo.

[21] Appl. No.: 571,789

[22] Filed: Jan. 18, 1984

[51] Int. Cl.⁴ .......................................... H01M 1/274
[52] U.S. Cl. .............................. 179/90 BD; 179/90 B; 340/365 VL; 340/825.03
[58] Field of Search ........... 179/90 B, 90 BB, 90 BD, 179/90 AD, 90 CS; 40/371, 372, 374; 350/110, 115; 335/205, 206, 207; 200/5 R; 340/825, 825.03, 365 VL

[56] References Cited

U.S. PATENT DOCUMENTS

| Re. 31,649 | 8/1984 | Brodbeck | 179/90 B |
|---|---|---|---|
| 4,178,487 | 12/1979 | Lake et al. | 179/90 BD |
| 4,186,279 | 1/1980 | Face | 179/90 B |
| 4,275,273 | 6/1981 | Ts'Ao | 179/90 B |
| 4,278,845 | 7/1981 | Chiou | 179/90 B |

FOREIGN PATENT DOCUMENTS

| 96444 | 6/1983 | Japan | 179/90 B |
|---|---|---|---|
| 1526486 | 9/1978 | United Kingdom | 179/90 B |

OTHER PUBLICATIONS

A. F. Higginbotham, Electronic Abbreviated Directory, IBM Technical Disclosure Bulletin, vol. 22, No. 6, Nov. 1979, 2216-2217.

Primary Examiner—Gene Z. Rubinson
Assistant Examiner—Robert G. Lev
Attorney, Agent, or Firm—Fields, Lewis, Pittenger & Rost

[57] ABSTRACT

Improved telephone number input terminal devices for memory stored dialing data for automatic dialing have a divided housing (12) with an upper section (13) that is readily attached to and removed from a base section (14) so that a printed circuit board (61) which carries a plurality of electric elements (17) may be made inexpensively and readily assembled. A single electric element (51) is carried on the card finder (25) which is slidable on and retained by an enlarged end portion of the cover (22) for the index cards. Light emitting diodes and Hall effect devices are examples of preferred electric elements that may be used in the switch means to effect the electric switching required.

11 Claims, 9 Drawing Figures

U.S. Patent Jun. 17, 1986 Sheet 2 of 3 4,595,798
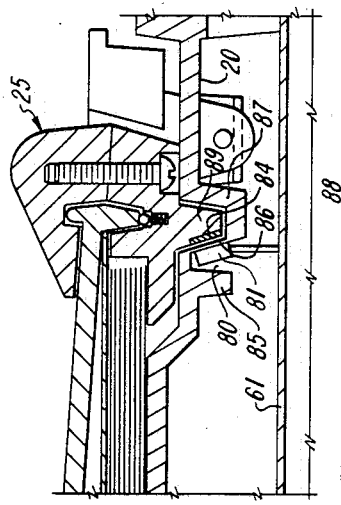
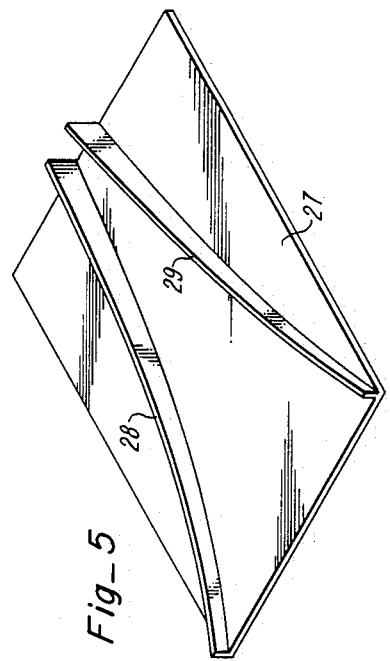
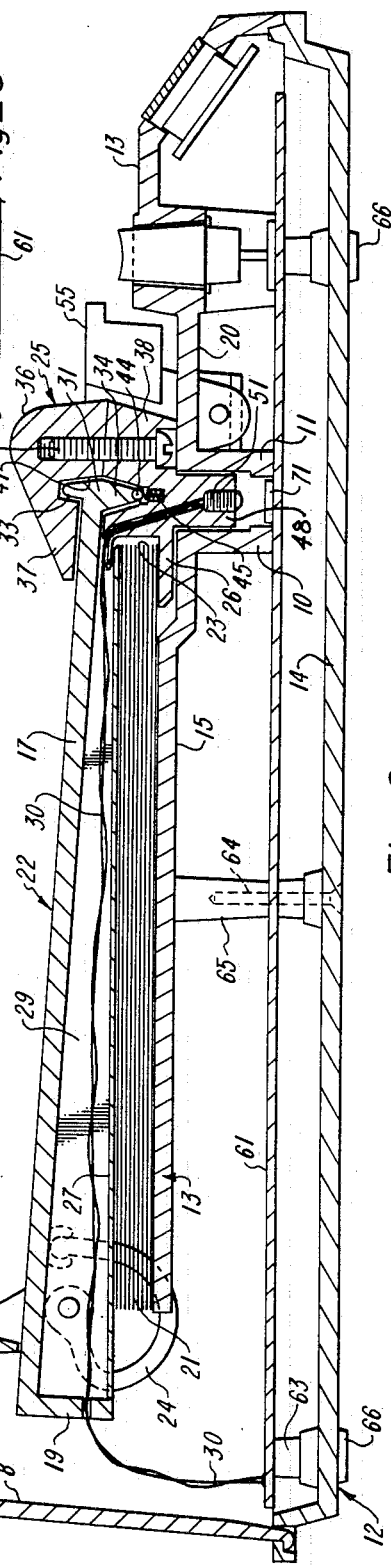

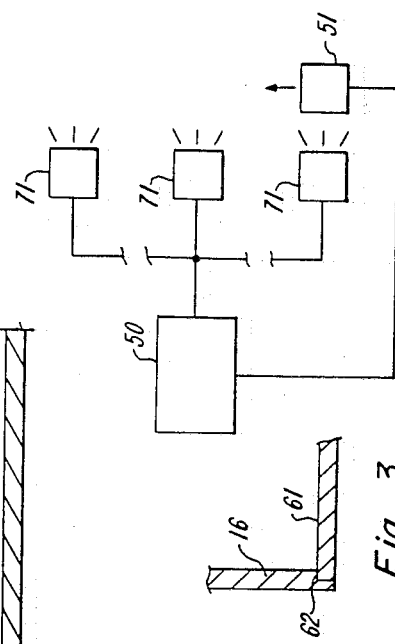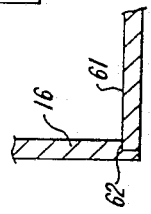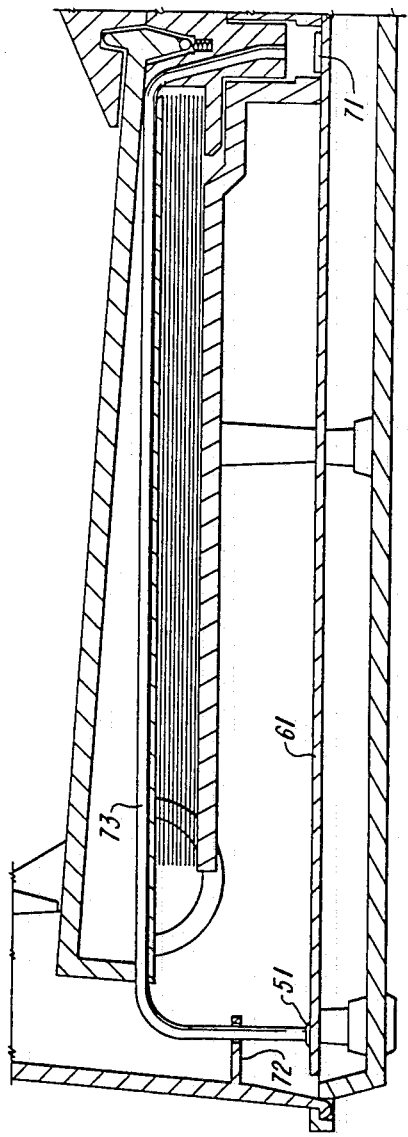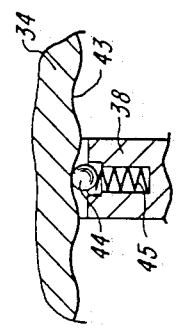

TELEPHONE NUMBER INPUT TERMINAL DEVICES

Technical Field

This invention relates to novel and improved telephone number input terminal devices for use in automatic telephone dialing.

Background Art

Background art for this invention is found in U.S. Pat. Nos. 4,164,630, 4,408,101 and 4,409,440, having the same inventor as the present invention.

Disclosure of Invention

Telephone number input terminal devices disclosed have a divided housing with an upper section and a base section. The upper section carries a plurality of electric elements extending across the housing at spaced intervals on a printed circuit board. Each electric element corresponds to an index dard having recorded thereon a plurality of telephone numbers. A card finder slides on and is retained by an enlarged end portion of a cover for the index cards and is arranged to be moved to selected settings along the cover. A single electric element is mounted on the card finder that interacts with an opposite electric element on the printed circuit board to comprise a card switch means that initially latches onto a block of data representing one card.

In one form of the invention disclosed the light-emitting diodes and a single light-sensing device are used. In a modified form disclosed fiber optics transmit the light from the light-emitting diodes to the light-sensing device. Another form disclosed has a plurality of Hall effect devices mounted on the printed circuit board in an inverted channel portion of the upper section. A magnet is carried by a bottom extension on the card finder that fits in an upright channel of the upper section to be guided for sliding movement therein. A selector switch for each line on each card is actuated after the card is selected to effect the dialing of a selected number.

BRIEF DESCRIPTION OF DRAWINGS

The details of this invention will be described in connection with the accompanying drawings, in which:

FIG. 2 is a sectional view taken along lines 2—2 of FIG. 1;

FIG. 3 is a fragmentary sectional view showing the fitting for the lower partitioning wall of the cover;

FIG. 4 is a fragmentary view showing the indexing arrangement for the card finder;

FIG. 5 is a bottom perspective view of the lower partitioning wall of the cover;

FIG. 6 is a sectional view of a modified form of input terminal device;

FIG. 7 is a sectional view of another form of input terminal device;

FIG. 8 is a fragmentary front elevational view showing the arrangement using Hall effect devices and a magnet that is shown in dashed lines for the device shown in FIG. 7; and FIG. 9 is a schematic circuit diagram.

DETAILED DESCRIPTION

Figure 1:
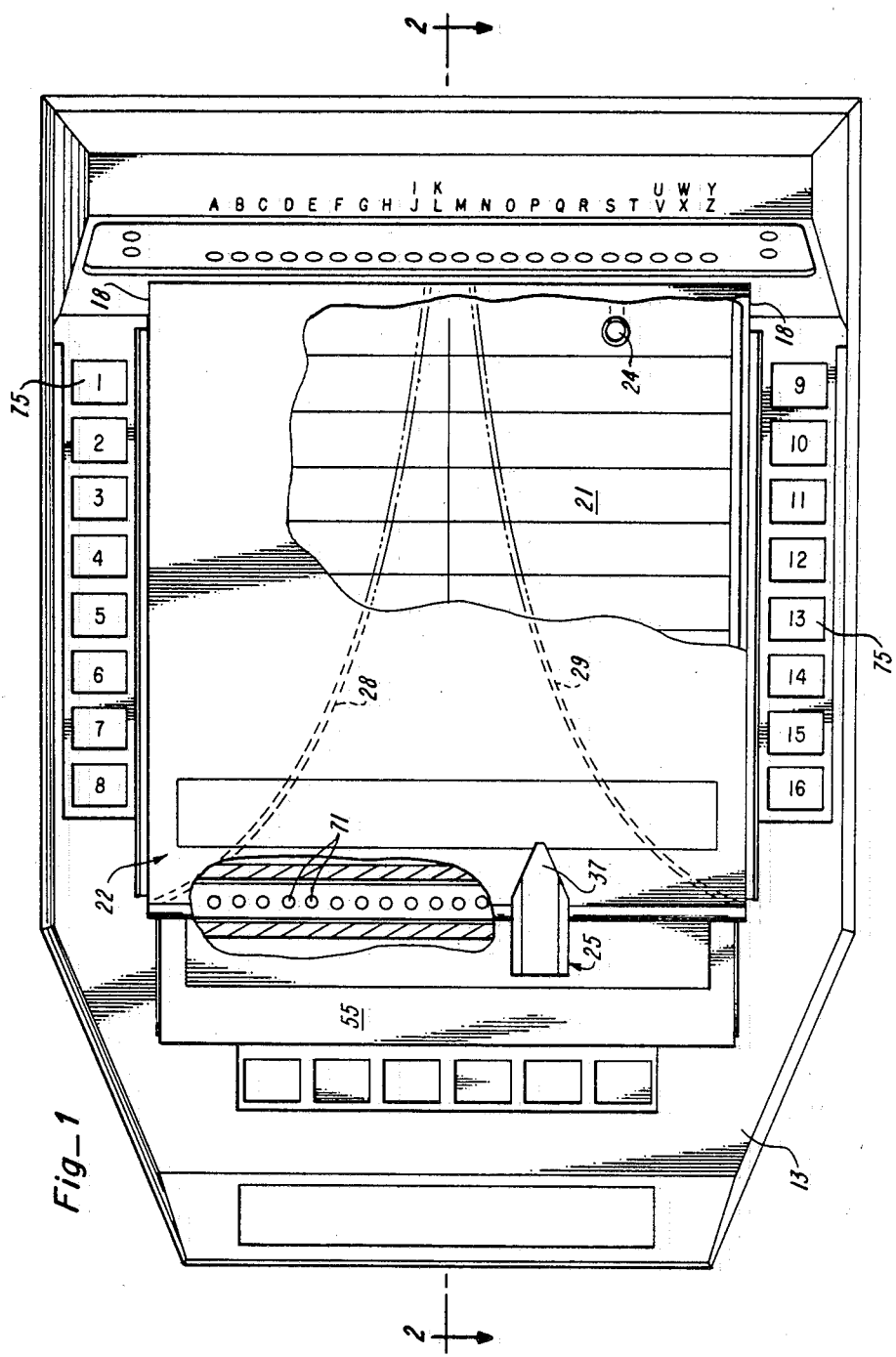
FIG. 1 is a top plan view of one form of an input terminal device embodying features of the present invention with portions broken away to show interior parts.

Referring now to the drawings, in FIGS. 1-5 there is shown an input terminal device which comprises a divided housing 12 including an upper section 13 and a base section 14 which are constructed of separate parts for ready access into the hollow interior of the housing and snap-fit together along interfitting edges to be separable from one another. A rear end cover 8 fits between the upper section 13 and the base section 14 at the back thereof and supports an upright display panel 9 at the rear of the cover.

A multiple card index is supported by the housing which includes a plurality of index cards 21 stacked one on another and a cover 22 that is hinged by a hinge 24 to swing between a closed position and an open position where a selected one of the cards is exposed. The hinge 24 is shown to extend through holes in the cards. The cards are stepped across the front edge, as indicated at 23, to cooperate with the movable card finder 25 hereinafter described. A lifter portion 26 of the finder is in the form of a forward projection that lifts and holds all cards that are not wanted and exposes the selected card, as is conventional in some telephone number index devices and is illustrated in U.S. Pat. No. 4,409,440.

An intermediate portion of the top wall has a recessed top wall section 20 arranged to receive and slidably support finder 25 and support release bar 55. The recessed top wall section 20 is formed with a transverse channel comprised of spaced front and rear wall sections 10 and 11, respectively, that receive and provide upright guide surfaces for the bottom section 48 of finder 25 which nests therein and is guided in its lateral movement relative to the upper section 13.

The cover 22 has a top wall 17, opposed depending sidewalls 18 and a back wall 19, together with a bottom partitioning wall 27 that is snap-fit in a notch in the lower ends of walls 17, 18 and 19. Wall 27 has two guide wall portions 28 and 29 projecting up from the top thereof which diverge toward the rear to direct electric wires 30 from the front end of the cover to the rear end of the cover so as to contain the wires within the cover 22 and permit the slide finder 25 to traverse the upper section. The top wall 17 of the cover has an enlarged front end portion 31 with an upstanding section 33 and a depending section 34 on which there is slidably mounted the card finder 25.

The card finder 25 includes a lower portion 38 and an upper portion 36, shown held together by a screw fastener 46. A pointer 37 projects forwardly of upper portion 36 and moves over and successively alines with letters of the alphabet shown on the face of panel 9. One alphabet letter or two alphabet letters correspond to one of the cards in the stack of cards. Although the alphabet letters are shown on the display panel 9 at the rear of the housing, they could be located immediately adjacent the pointer 37.

The card finder 25 has a forwardly facing generally C-shaped recess or channel 41 that slidably nests over and is retained by the enlarged front end portion 31 of the cover. As shown in FIG. 4, the lower edge of depending section 34 has a sinuous or corrugated surface 43 with the valleys for each setting of the finder. A ball 44 is urged by a spring 45 into a selected valley to index the pointer to a selected letter of the alphabet, which in turn corresponds to one index card.

An electric element 51 shown, which is a light sensing device such as a photodiode, is mounted in a hole in the lower portion 38 and has the electric wires 30 connected thereto which pass through an inclined hole in the lower portion 38. The hole opens into the inside compartment in the cover 22. The guide walls 28 and 29 guide the wires 30 so that the finder 25 can move between all pointer settings across the cover. The cover 22 is normally held closed by a release bar 55 which, under pressure, releases the cover 22, which is biased to move to a raised position to expose a selected card 21.

A printed circuit board 61 located in the upper section 13 is held therein in a notched edge 62 on each sidewall 16 of the upper housing section 13, as shown in FIG. 3, as well as by standoffs 63 formed on the base section 14. The base section 14 is placed in position on the upper section 13 and screws 64 shown are threaded through the standoffs 63 and into standoffs 65 in the upper section 13 to hold the bottom or base section 14 onto the upper section 13. Feet 66 are provided on the base section to raise it above a supporting surface. Sufficient space is provided in the base section to accommodate a speaker. The base section has openings (not shown) to emit the sounds from the speaker.

A plurality of electric elements 71, preferably light emitting diodes or the like, are mounted on the printed circuit board 61 at equally spaced intervals across the board. The pointer 37 is arranged to aline successively with each letter or letter pair of the alphabet and for each setting the light sensing device 51 is in substantial alinement with one of the light emitting diodes 71.

By using the single light sensing device 51 and the plurality of light emitting diodes 71, the position of the pointer 37 can readily be determined by means of a control device represented at 50 in FIG. 9. Control device 50 is preferably a microprocessor that will control the sequence of illumination of each individual diode 71 and receive an output from the light sensing device 51 when alined with an illuminated diode 71, using a well known microprocessor technology.

In a full sequence of operation the index pointer 37 is moved to a selected position as, for example, by placing the pointer 37 in alinement with the letter "C" so that the "C" card is selected.

The microprocessor controls the sequence of illumination of each individual diode 71. At any given time only one diode 71 is illuminated. The light sensing device 51 delivers an output that is coupled to the control device 50 when it is alined with one of the illuminated diodes 71. When so alined, a block of data corresponding to the selected card is latched onto and held. The latching circuit remains latched until the pointer 37 is moved to another setting. In the usual operation the release bar 55 is depressed, the cover 22 is raised, and the selected card 21 is exposed.

The name and number on the card are selected by depressing an electric push button 75 adjoining the card and located in juxtaposition to a line. There are sixteen push buttons shown and these push buttons bear numerical indicia from one to sixteen. Each push button is connected in a second circuit corresponding to a particular card which, upon actuation, is effective to retrieve and automatically dial a number stored in a memory corresponding to the telephone number of the particular line that has been selected, as is described in the above mentioned U.S. Pat. No. 4,164,630.

The advantage of the above described circuit is that only one electric element is carried by the finder and no moving parts are required. Light emitting diodes are relatively inexpensive as compared to other types of electric switching devices.

In the form shown in FIG. 6, in place of having the light sensing device 51 carried within the finder, a conventional fiber optic tube 73 comprised of a bundle of fiber optic filaments extends through the finder hole previously occupied by wires 30 and extends through the cover 22 and down into proximity with the printed circuit board 61 at the rear end thereof. A suitable brace 72 holds the end of the tube opposite the light sensing device 51 which is mounted on the printed circuit board 61. This construction eliminates the necessity of having electric wires associated with the cover or card index and the card finder 25.

Referring now to the device shown in FIGS. 7 and 8, the recessed top wall section 20 shown has an inverted V-shaped channel 80 formed therein, opening along the bottom, comprised of a rear wall section 85 and a front thin membrane 86 to provide downwardly diverging support seating surfaces for Hall effect devices 81 that are disposed at equally spaced intervals across the housing. The membrane 86, a front wall section 87, and a bottom section 88 form an upright channel in which a V-shaped bottom section 89 of finder 25 is slidably received to guide the finder 25 as it is moved across the upper section.

The printed circuit board 61 carries the Hall effect devices 81. In assembling the device, the Hall effect devices 81 are slid into the inverted channel 80 which maintains them in position and in alinement. A magnet 84 is mounted on bottom section 89 which successively alines with the Hall effect devides 81 to successively actuate the same as the slide finder 25 is moved across the housing, in the same manner as is disclosed in U.S. Pat. No. 4,408,101.

Although the present invention has been described with a certain degree of particularity, it is understood that the present disclosure has been made by way of example and that changes in details of structure may be made without departihg from the spirit thereof.

What is claimed is:

1. In a telephone number input terminal device for memory stored dialing data for automatic telephone dialing, the combination comprising:
  a divided housing including an upper section and a base section removable from said upper section;
  multiple card index means in said housing including a plurality of cards one on another for visual listing of names and telephone numbers, each card including individual lines for individual names and telephone numbers, a cover positioned over said cards, and finding means including a hand-actuated finder movable along said cover for positioning an individual card for visual display of the card's content, said cover having an enlarged front end portion and said finder having a C-shaped recess to receive said enlarged end portion to slidably move on and be retained by said enlarged end position, said finder being guided for movement in a recessed area of said upper section and held at selected positions for each dard;
  card switch means activated by positioning said finding means, said card switch means including a first electric element corresponding to each card, each said first electric element being a light emitting device that is successively turned on and off by a control device, said electric elements being disposed atspaced intervals across the housing and being mounted on a printed circuit board supported in said upper section, said printed circuit board being insertable into and removable from said upper section, and a second electric element operatively interactive with each said first electric element when substantially aligned therewith, said second electric element being carried by said finder, said second electric element being a light sensing device that transmits an output to said control device when opposite an illuninated light emitting device, said car switch means intitally latching onto a memory block of data representing an individual card when said cover is closed, said latching being completed via said card switch means when the cover is closed whereby, with a first card selection and with said cover closed, the latching for the first card selected remains in effect until said finder is moved to a second card selection and said cover is closed; and selector switch means including a number of push buttons equal to the number of lines on one of said cards, one of said push buttons associated with each of said lines, each said push button connected in a second circuit corresponding to a particular line and a particular selected card which, upon activation of a selected push button, is effective to retrieve and automatically dial a telephone number stored at a location in a memory corresponding with the telephone number of the particular line that has been selected.

2. In a telephone number input terminal device for memory stored dialing data for automatic telephone dialing, the combination comprising:

a divided housing including an upper section and a base section;

multiple card index means in said housing including a plurality of cards one on another for visual listing of names and telephone numbers, each card including individual lines for individual names and telephone numbers, a cover positioned over said cards, and finding means including a hand-actuated finder movable along said cover for positioning an individual card for visual display of the card's content;

card switch means activated by positioning said finding means, said card switch means including a first electric element corresponding to each card, each said first electric element being a light emitting device that is successively turned on and off by a control device, said electric elements being disposed at spaced intervals across the housing and being mounted ona printed circuit board supported in said upper section, and a second electric element operatively interactive with each said first electric element when substantially aligned therewith, said second electric element being carried by said finder, said second electric element being a light sensing device that transmits an output to said control device when opposite an illuminated light emitting device, said card switch means initially latching onto a memory block of data representing an individual card when said cover is closed, said latching being completed via said card switch means when the cover is closed whereby, with a first card selection and with said cover closed, the latching for the first card selected remains in effect until said finder is moved to a second card selection; and selector switch means including a number of push buttons equal to the number of lines on one of said cards, one of said push buttons associated with each of said lines, each said push button connected in a second circuit corresponding to a particular line and a particular selected card which, upon activation of a selected push button, is effective to retrieve and automatically dial a telephone number stored at a location in a memory corresponding with the telephone number of the particular line that has been selected.

3. In a telephone number input terminal device for memory stored dialing data for automatic telephone dialing, the combination comprising:

a divided housing including an upper section and a base section;

multiple card index means in said housing including a plurality of cards one on another for visual listing of names and telephone numbers, each card including individual lines for individual names and telephone numbers, a cover positioned over said cards, said cover having an end portion with a corrugated surface, and finding means including a hand-actuated finder movable along said cover for positioning an individual card for visual display of the card's content, said finder carrying a spring-biased ball to locate said finder at discrete positions across said cover;

card switch means activated by positioning said finding means, said card switch means including a first electric element corresponding to each card, said electric elements being disposed at spaced intervals across the housing and being mounted on a printed circuit board supported in said upper section, and a second electric element operatively interactive with each said first electric element when substantially aligned therewith, said second electric element being carried by said finder, said card switch means intitially latching onto a memory block of data representing an individual card when said cover is closed, said latching being completed via said card switch means when the cover is closed whereby, with a first card selection and with said cover closed, the latching for the first card selected remains in effect until said finder is moved to a second card selection; and selector switch means including a number of push buttons equal to the number of lines on one of said cards, one of said push buttons associated with each of said lines, each said push button connected in a second circuit corresponding to a particular line and a particular selected card which, upon activation of a selected push button, is effective to retrieve and automatically dial a telephone number stored at a location in a memory corresponding with the telephone number of the particular line that has been selected.

4. In a telephone number input terminal device as set forth in claim 2 wherein said light sensing device is a photodiode and said control device is a microprocessor.

5. In a telephone number input terminal device as set forth in claim 2 including a fiber optic tube having one end adjacent said first electric elements and the opposite end adjacent said second electric element which is mounted on said printed circuit board.

6. In a telephone number input terminal device as set forth in claim 2 wherein said cover has an enlarged end portion and said finder has a recess that is generally complementary in shape to said enlarged end portion to slidably move on and be retained by said enlarged end portion.

7. In a telephone number input terminal device as set forth in claim 2 wherein said finder has a bottom extension that slidably moves in and is guided by a recessed channel in said upper section.

8. In a telephone number input terminal device for memory stored dialing data for automatic telephone dialing, the combination comprising:

a divided housing including an upper section and a base section;

multiple card index means in said housing including a plurality of cards one on another for visual listing of names and telephone numbers, each card including individual lines for individual names and telephone numbers, a cover positioned over said cards, and finding means including a hand-actuated finder movable along said cover for positioning an individual card for visual display of the card's content;

card switch means activated by positioning said finding means, said card switch means including a first electric element corresponding to each card, said first electric element being a Hall effect device, said electric elements being disposed at spaced intervals across the housing and being mounted on a printed circuit board supported in said upper section, and a second electric element operatively interactive with each said first electric element when substantially aligned therewith, said second electric element being a magnet, said second electric element being carried by said finder, said card switch means initially latching onto a memory block of data representing an individual card when said cover is closed, said latching being completed via said card switch means when the cover is closed whereby, with a first card selection and with said cover closed, the latching for the first card selected remains in effect until said finder is moved to a second card selection; and selector switch means including a number of push buttons equal to the number of lines on one of said cards, one of said push buttons associated with each of said lines, each said push button connected in a second circuit corresponding to a particular line and a particular selected card whch, upon activation of a selected push button, is effective to retrieve and automatically dial a telephone number stored at a location in a memory corresponding with the telephone number of the particular line that has been selected.

9. In a telephone number input terminal device as set forth in claim 8 wherein said upper section has an inverted channel that receives and supports said Hall effect devices.

10. In a telephone number input terminal device as set forth in claim 9 wherein said upper section has an upright channel and a membrane forming a common wall with said inverted channel, said finder having a bottom section that is slidable in and guided by said upright channel, said magnet being supported in said bottom section and slidable along said membrane.

11. In a telephone number input terminal device as set forth in claim 10 wherein said channels and said bottom section are generally V-shaped.

* * * * *